(12) United States Patent
Voeller et al.

(10) Patent No.: US 6,219,134 B1
(45) Date of Patent: Apr. 17, 2001

(54) ROLLING RUNOUT COMPENSATION FOR WHEEL ALIGNMENT

(75) Inventors: David A. Voeller, Maryland Heights; Nicholas J. Colarelli, III, Creve Coeur; Timothy A. Strege, Ballwin, all of MO (US)

(73) Assignee: Hunter Engineering Co., Bridgeton, MO (US)

( * ) Notice: Subject to any disclaimer, the term of this patent is extended or adjusted under 35 U.S.C. 154(b) by 0 days.

(21) Appl. No.: 09/262,524

(22) Filed: Mar. 4, 1999

(51) Int. Cl.$^7$ .............................. G01B 11/26; G01B 5/24; G01M 1/38
(52) U.S. Cl. ................................. 356/139.09; 33/203.12; 33/203.18; 700/279
(58) Field of Search ....................... 700/279; 356/139.09; 33/203.18, 203.12, 288

(56) References Cited

U.S. PATENT DOCUMENTS

| | | | | |
|---|---|---|---|---|
| Re. 33,144 | * | 1/1990 | Hunter et al. ................. | 356/139.09 |
| 4,319,838 | * | 3/1982 | Grossman et al. ............. | 356/139.09 |
| 5,014,227 | * | 5/1991 | Kling et al. ................... | 33/203.18 |
| 5,488,471 | * | 1/1996 | McClenahan et al. ......... | 356/139.09 |
| 5,488,472 | * | 1/1996 | January ......................... | 356/139.09 |
| 5,489,983 | * | 2/1996 | McClenahan et al. ......... | 356/139.09 |
| 5,675,515 | * | 10/1997 | January ........................ | 700/279 |
| 5,724,128 | * | 3/1998 | January ........................ | 356/139.09 |

\* cited by examiner

*Primary Examiner*—Stephen C. Buczinski
(74) *Attorney, Agent, or Firm*—G. E. Upchurch; G. D. Kang; D. J M Donahue

(57) ABSTRACT

A system for measuring vehicle alignment angles has a plurality of sensor elements for mounting to wheels of a vehicle to be aligned. The system uses the sensor elements to measure various angles such as steer ahead angle and toe, and the system also has a display for displaying information to a user and a memory for storing operating instructions for the system. Operating instructions are stored in the memory for determining from compensation measurements taken at a minimum of first and second longitudinally displaced positions whether the toe parameter of two wheels falls outside a predetermined toe range, and whether the steer ahead angle of the vehicle falls within a predetermined range. The operating instructions stored in the memory further include instructions responsive to the toe parameter falling outside the toe range to control the system to display to the user information indicative of the need to adjust the toe parameter before taking additional compensation measurements. The operating instructions stored in the memory further include instructions responsive to the toe parameter not falling outside the toe range and to the steer ahead angle falling outside the predetermined range to control the system to display to the user information indicative of the need to adjust steer ahead angle before taking additional compensation measurements.

25 Claims, 5 Drawing Sheets

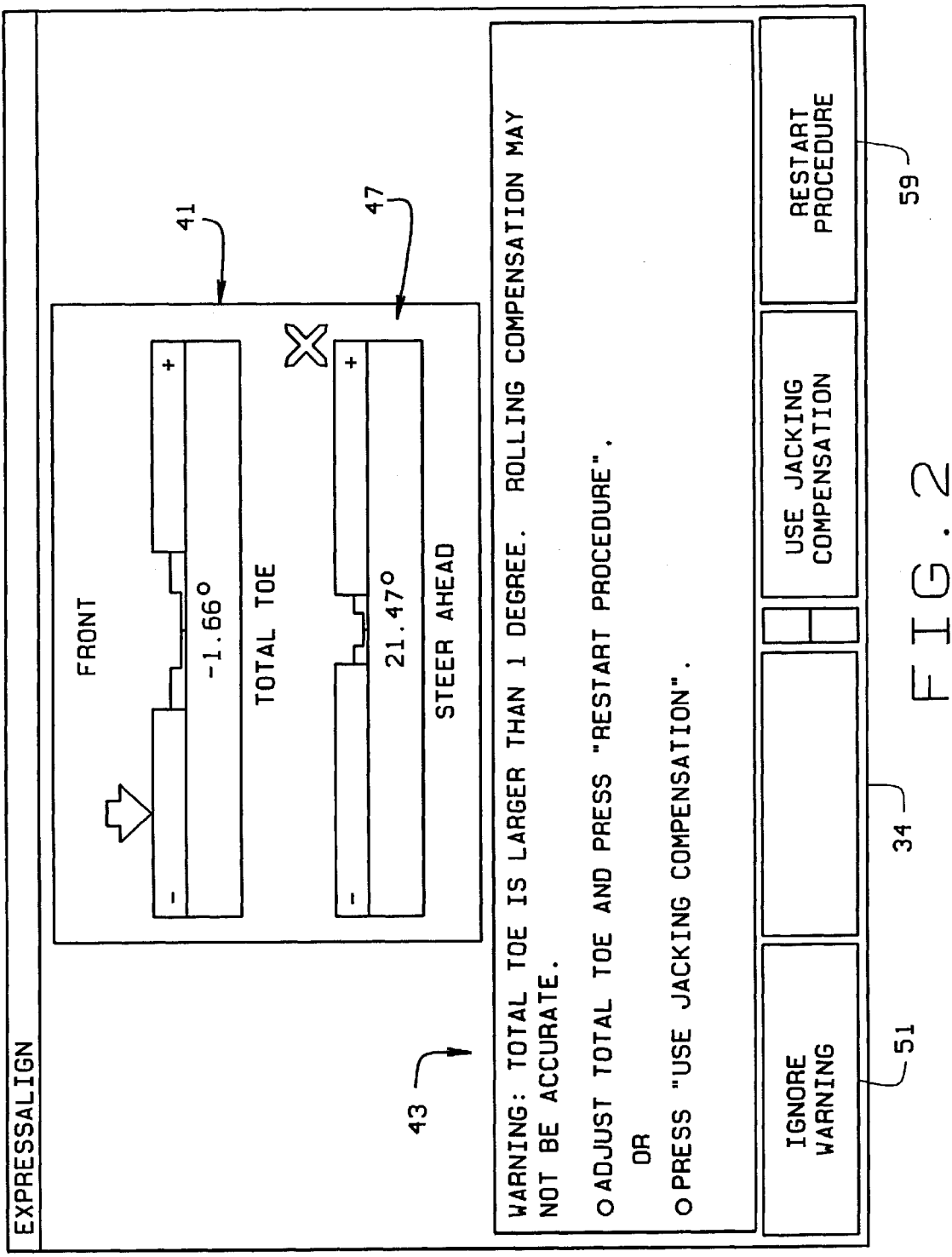

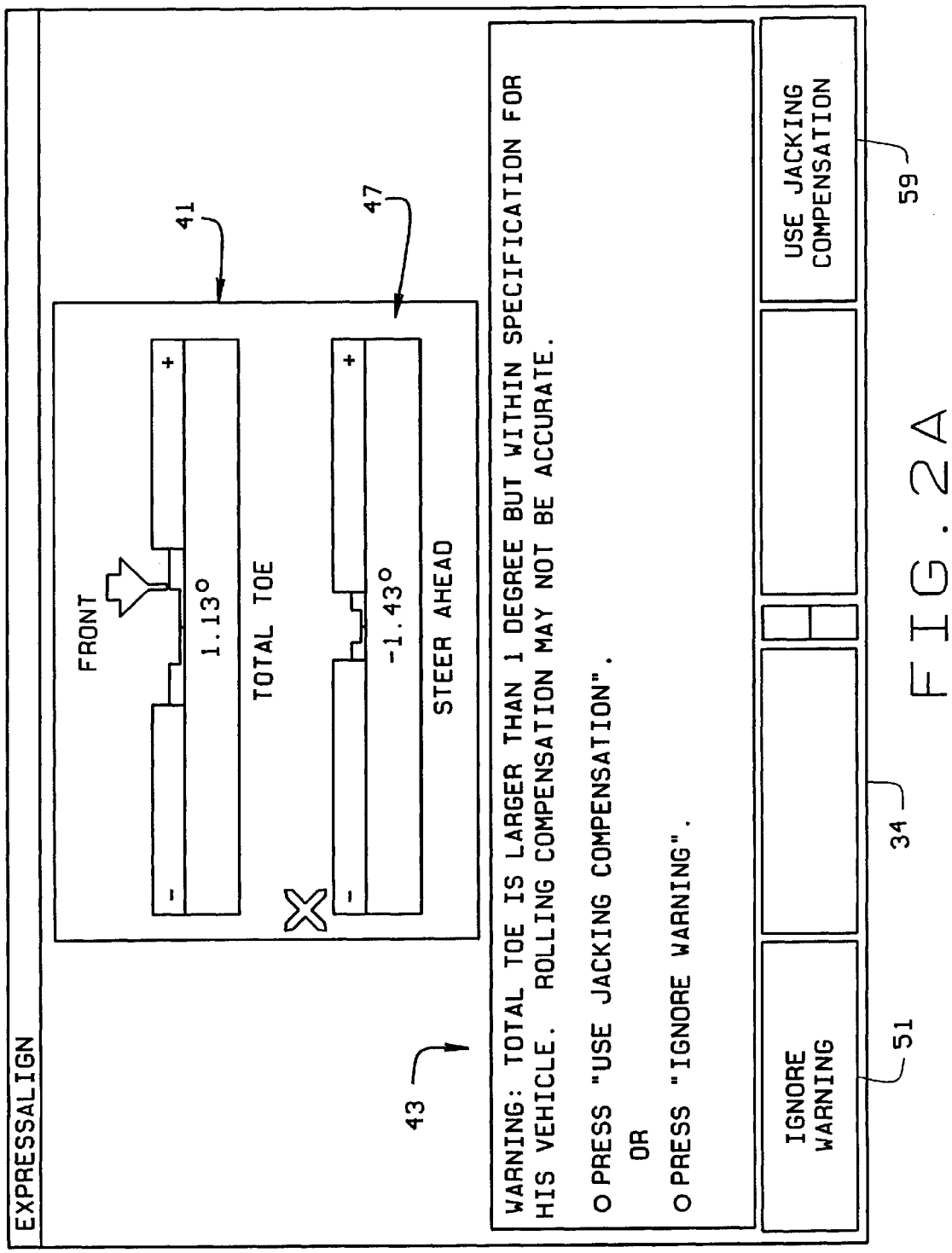

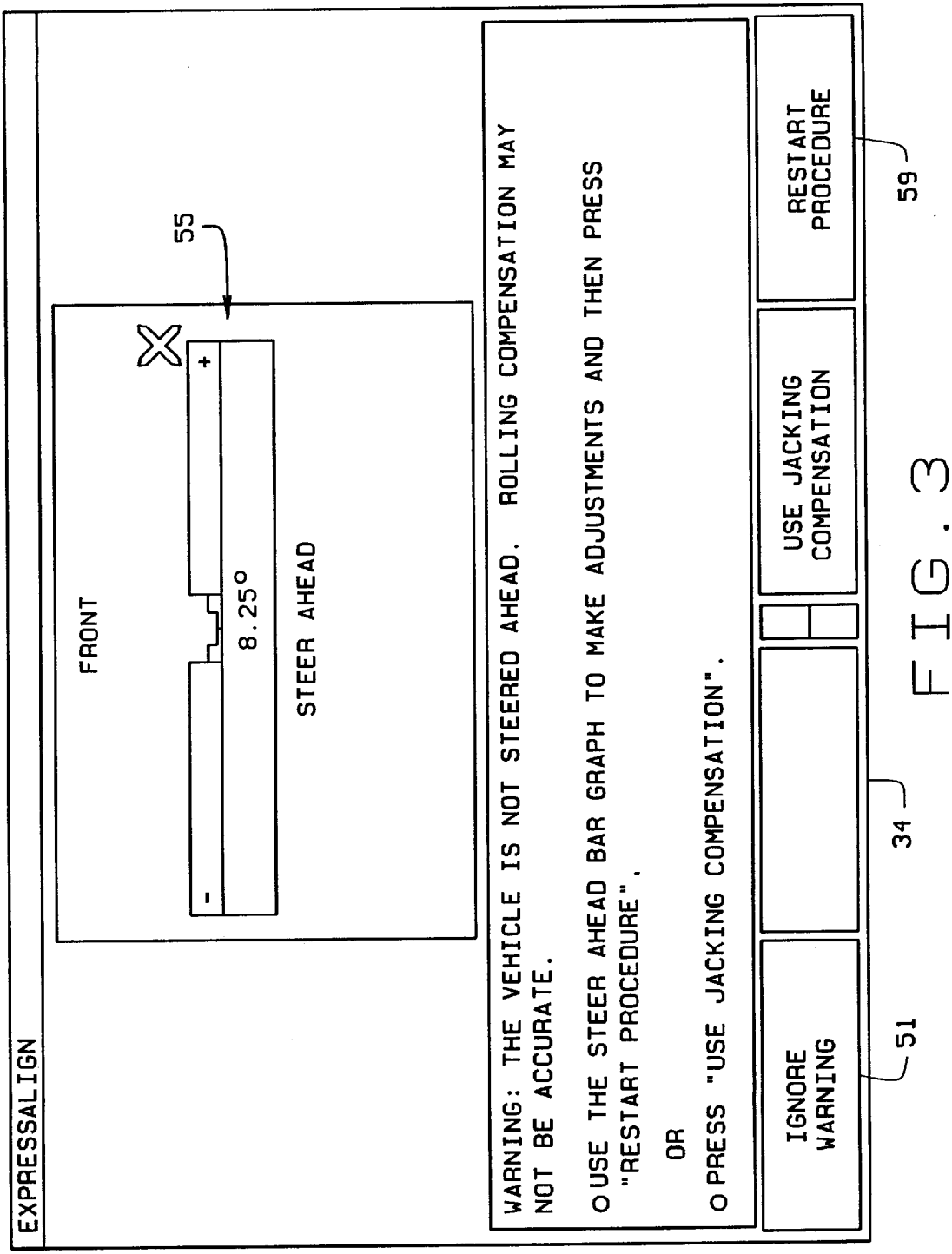

ROLLING RUNOUT COMPENSATION FOR WHEEL ALIGNMENT

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention relates to vehicle wheel alignment, and more particularly to compensation schemes for vehicle wheel alignment systems which measure the locations and orientations of the vehicle wheels in a three dimensional coordinate system.

Various systems have been designed to determine vehicle wheel alignment angles. For example, U.S. Pat. No. Re 33,144 to Hunter and January and U.S. Pat. No. 4,319,838 to Grossman and January each describe a wheel alignment system which uses electro-optical transducers to determine the toe alignment angles of a vehicle. FIG. 2 of each of these patents shows six angle transducers carried by support assemblies which are mounted to the vehicle wheels. FIG. 4 of U.S. Pat. No. Re 33,144 and FIG. 9 of U.S. Pat. No. 4,319,838 show the geometry of this arrangement and illustrate the six angles which are directly measured. These patents further describe (see U.S. Pat. No. Re 33,144 col. 7 lines 26–39, and U.S. Pat. No. 4,319,838 col. 8 line 63 to col. 9 line 12) how the toe alignment angles are computed from the angles directly measured by the angle transducers. The disclosures of these patents is hereby incorporated herein by reference.

SAE Publication 850219, titled "Steering Geometry and Caster Measurement", by January, derives and discusses the procedures and methods by which toe and camber alignment transducers are used to determine the caster and steering axis inclination (SAI) of a vehicle. The procedures described therein are the industry standard.

Equipment of this general type and using the apparatus and methods enumerated above has been used world-wide for many years. Such equipment is capable of determining the camber, caster, and pointing or "toe" alignment angles of the wheels relative to one or more appropriate reference axes, and is sufficient to allow proper adjustment of the alignment so as to reduce tire wear and provide for safe handling. It is believed, however, that such equipment could be improved.

German Patent DE 29 48 573 A1, assigned to Siemens A G, describes the use of cameras to determine the locations and orientations of the wheels of a vehicle. On each side of the vehicle, a single camera is moved to multiple positions to view the vehicle wheels. Alternatively, a single fixed camera is used at each side in conjunction with movable mirrors, or multiple cameras are used. The system examines the images thus viewed of the wheels of the vehicle to determine the locations and orientations of the wheels, from which the wheel alignment parameters are determined.

European Patent Application PCT/US93/08333, filed in the name of Jackson and published under the Patent Cooperation Treaty as WO 94/05969 (hereinafter referred to as WO document 94/05969), describes the use of a camera having one or more defined fields of view to view optical targets of known configurations which are mounted to the vehicle wheels. Through the use of sophisticated image recognition methods, the three dimensional coordinates and orientations of the vehicle wheels and their corresponding axes of rotation are determined. The wheel alignment parameters are determined from these coordinates and orientations. The disclosures of U.S. Pat. Nos. 5,675,515, 5,724,128, 5,489,983, 5,488,472, and 5,488,471 are hereby incorporated herein by reference.

There exists a clear need for apparatus and methods which allow a proper determination of the alignment of the vehicle wheels. In particular, there is a clear need for such an apparatus which provides a rapid and accurate compensation of the sensor elements used to measure vehicle alignment angles. For example, proper alignment using video systems is critically dependent upon accurate determination of the positions of the targets in the field of view, which requires accurate initial compensation of the sensor elements/targets.

Prior art compensation makes one large (and sometimes incorrect) assumption—that changes in measurements from one wheel orientation/position to another wheel orientation/position are due to runout and not to changes in alignment. But when a vehicle is rolled from one position to another, lateral forces on the tires can change both camber and toe. Moreover, movement of the steering wheel can change the steer ahead angle. (Even though the vehicle steering wheel is usually leveled and locked, that does not guarantee that the steer ahead angle will not change). In both instances (changes in camber and/or toe, and changes in steer ahead angle) prior art systems interpret these changes as runout which produces an erroneous compensation, and which can result in erroneous alignment measurements.

In one existing video alignment system, a first compensation measurement is taken at a first (forward) position of the vehicle, the vehicle is rolled rearwardly and a second compensation measurement is taken at a second position. Finally, the vehicle is rolled back to the original position and a third compensation measurement is taken. If the measurements are not acceptable, this prior art system gives a warning of wheel wobble, but provides no on-screen information to the user as to the possible (or probable) cause of the wobble. With the prior art system, the user must continue to repeat the procedure until the measurements are accepted, or the user can bypass the compensation altogether. These solutions, however, result in less than desirable accuracy in the subsequent alignment of the vehicle. The prior art can be improved.

SUMMARY OF THE INVENTION

Among the various objects and features of the present invention may be noted the provision of an improved compensation system for a vehicle alignment system.

A second object is the provision of such a system which is particularly useful with video alignment systems.

A third object is the provision of such a system which provides feedback to the user which allows the user to correct causes of inaccurate compensation.

A fourth object is the provision of a system which identifies to the user the probable cause of any inaccuracy in the compensation of the sensor elements.

Other objects and features will be in part apparent and in part pointed out hereinafter.

Briefly, in a first aspect of the present invention, a system for measuring vehicle alignment angles has a plurality of sensor elements (which can be active sensors or passive sensor elements such as visual targets) for mounting to wheels of a vehicle to be aligned. The system uses the sensor elements to measure various angles such as steer ahead angle and toe, and the system also has a display for displaying information to a user and a memory for storing operating instructions for the system. Operating instructions are stored in the memory for determining from compensation measurements taken at a minimum of first and second longitudinally displaced positions whether the toe parameter of the two front wheels falls outside a predetermined toe range, and whether the steer ahead angle of the vehicle falls within a predetermined range. The operating instructions stored in the memory further include instructions responsive to the toe parameter falling outside the toe range to control the system to display to the user information indicative of the need to adjust the toe parameter before taking additional compensation measurements. The operating instructions stored in the memory further include instructions responsive to the toe parameter not falling outside the toe range and to the steer ahead angle falling outside the predetermined range to control the system to display to the user information indicative of the need to adjust steer ahead angle (i.e., turn the steering wheel) before taking additional compensation measurements.

In a second aspect of the present invention, a system for measuring vehicle alignment angles has a plurality of sensor elements for mounting to wheels of a vehicle to be aligned. The system uses the sensor elements to measure various angles such as steer ahead angle and toe. The system also has a display for displaying information to a user and a memory for storing operating instructions for the system. Operating instructions are stored in the memory for determining from compensation measurements taken at a minimum of first and second longitudinally displaced positions whether the toe parameter of the two front wheels falls outside a predetermined toe range, and whether the steer ahead angle of the vehicle falls within a predetermined range. The operating instructions stored in the memory further including instructions responsive to the toe parameter falling outside the toe range to control the system to display to the user information indicative of the need to adjust the toe parameter before taking additional compensation measurements.

In a third aspect of the present invention, a system for measuring vehicle alignment angles has a plurality of sensor elements for mounting to wheels of a vehicle to be aligned. The system uses the sensor elements to measure various angles such as steer ahead angle and toe. The system also has a display for displaying information to a user and a memory for storing operating instructions for the system. Operating instructions are stored in the memory for determining from compensation measurements taken at a minimum of first and second longitudinally displaced positions whether the toe parameter of the two front wheels falls outside a predetermined toe range, and whether the steer ahead angle of the vehicle falls within a predetermined range. The operating instructions stored in the memory further including instructions responsive to the toe parameter not falling outside the toe range and to the steer ahead angle falling outside the predetermined range to control the system to display to the user information indicative of the need to adjust steer ahead angle before taking additional compensation measurements.

In a fourth aspect of the present invention, a method of compensating sensor elements in a vehicle alignment apparatus includes the steps of taking compensation measurements with the vehicle in a first position, taking compensation measurements with the vehicle in a second position, the second position being longitudinally displaced from the first position, and determining from the compensation measurements taken at the first and second positions whether the toe parameter of the two front wheels falls outside a predetermined toe range, and whether the steer ahead angle of the vehicle falls within a predetermined range. If the toe parameter falls outside the toe range, the apparatus is controlled to display to the user information indicative of the need to adjust the toe parameter before taking additional compensation measurements. If the toe parameter falls within the predetermined toe range and the steer ahead angle falls outside the predetermined range, the apparatus is controlled to display to the user information indicative of the need to adjust steer ahead angle before taking additional compensation measurements.

In a fifth aspect of the present invention, a compensation method for vehicle alignment system sensor elements includes the steps of taking compensation measurements at a first position of a vehicle, moving the vehicle longitudinally and taking compensation measurements at a second position of the vehicle, estimating from the measurements taken at a minimum of the first and second positions whether compensation is acceptable, and identifying to the user a probable cause of inaccuracy in the compensation procedure in those instances where compensation cannot be accurately calculated.

BRIEF DESCRIPTION OF THE DRAWINGS

FIGS. 2 and 2a are representations of screens used to guide the user in compensating the sensor elements of the system when the toe parameter falls outside a predetermined toe range; and FIG. 3 is a representation of a screen used to guide the user in compensating the sensor elements of the system when steer ahead falls outside a range.

Similar reference characters indicate similar parts throughout the several views of the drawings.

DETAILED DESCRIPTION OF THE PREFERRED EMBODIMENT

It is preferred that the present invention be embodied in a computer controlled vehicle wheel alignment system, as is usual and customary in the art. Most modern wheel alignment systems are built using an off-the-shelf IBM compatible personal computer (PC) which is connected to the requisite alignment sensor elements through the built-in serial ports of the PC or through custom designed hardware. Often this computer is disposed at a separate console, and performs all the requisite computations. Of course, the present invention could be implemented in that manner, it is preferred that it be implemented as discussed below. Moreover, although the invention is described herein in connection with a video alignment, it will be appreciated that it is equally applicable to aligners using more conventional sensor elements.

As will be discussed in more detail presently, the sensor elements of the present invention consist of optical targets mounted to the vehicle wheels and one or more cameras or other image sensing devices which are made to view the optical targets of the various co-assigned patents discussed above, the full disclosures of which are incorporated herein by reference, disclose how alignment angles are determined using such apparatus. For purposes of the present invention, the term camera is used herein to refer to any such image sensing device.

Figure 1:
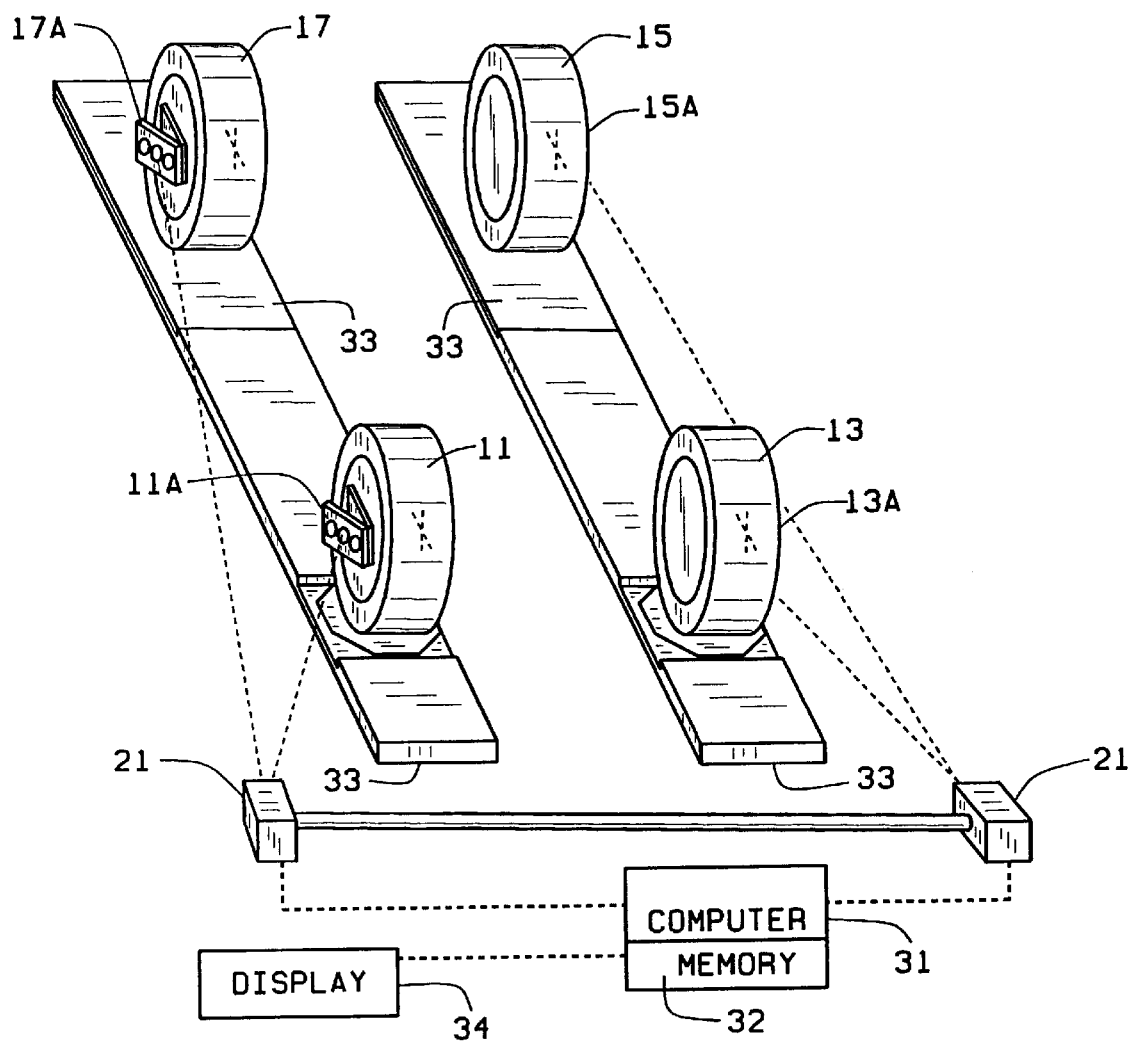
FIG. 1 a simplified diagram of a wheel alignment system of the present invention.

FIG. 1 illustrates the basic components of the system of the present invention which determines the coordinates and orientations of the vehicle wheels 11, 13, 15, 17, and the axes about which they roll. Each wheel has associated therewith one or more optical targets 11A, 13A, 15A, and 17A. The images of the targets are obtained in one or more cameras 21. The optical paths between the targets and the corresponding cameras are illustrated by dashed lines in FIG. 1. The signals from the camera(s) are supplied to a computer 31 where the images are processed to determine the various alignment angles. Although computer 31 is shown as physically separated from the cameras, the computer could be disposed in the same housing as one or more of the cameras.

Computer 31 is under control of various instructions stored in the computer memory 32, which can take the form of disk memory storage, RAM, ROM, and all the various forms thereof. The process of calculating the alignment angles may be done in many ways, such as shown in U.S. Pat. Nos. 5,488,472, and 5,675,515 and 5,724,128, the disclosures of which are incorporated herein by reference.

The vehicle may be rolled along a path (indicated by runners 33) which may or may not be part of a lift mechanism (not shown). Runners 33 may have various plates or subsections, as known in the art, for various purposes not particularly relevant to the present invention.

Figure 1A:
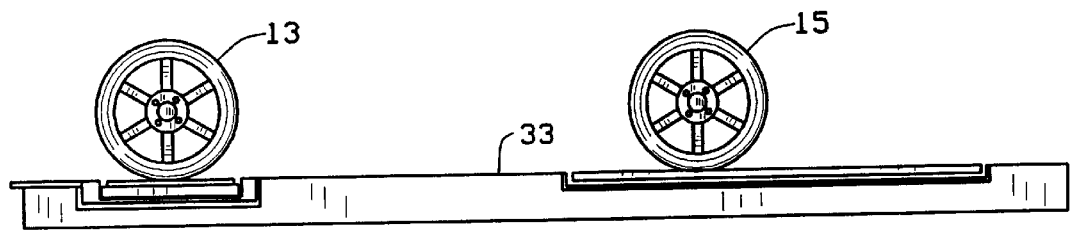
FIGS. 1a–1c are side elevations illustrating the relative positions of the vehicle wheels at various steps in the compensation process.
Figure 1B:
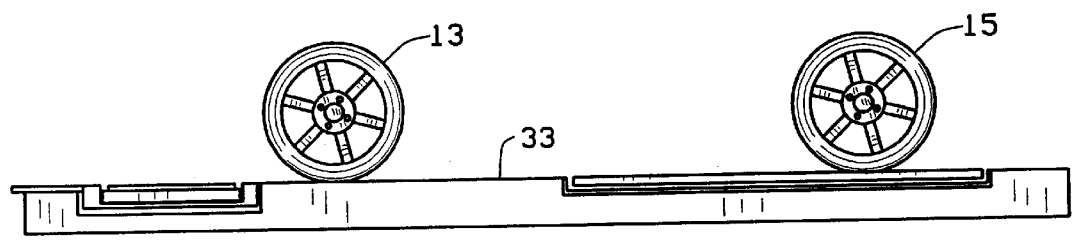
Figure 1C:
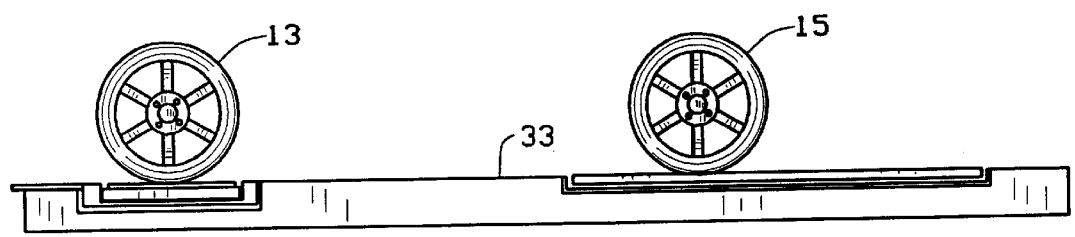

In practicing the present invention, the vehicle is positioned in a first position along the path disposed rearwardly from that position shown in FIG. 1a to that shown in FIG. 1b. At that position, compensation measurements are taken. The vehicle is then moved longitudinally forwardly to the position shown in FIG. 1c and a second set of compensation measurements are taken. From a minimum of these two sets of measurements, various alignment angles are calculated as described in the aforementioned U.S. patents incorporated herein by reference. Specifically, the total toe on the front axle (the total toe of wheels 11 and 13) is calculated, as is the steer ahead angle, under control of the operating instructions for the computer. As is known, the steer ahead angle or steer ahead is determined by comparing the toe of the front wheels to the thrust line of the vehicle. Although the present invention is described in connection with total toe, it should be understood that other toe parameters could be used as well, given the well-known relationship of total toe to the individual toe measurements for the individual wheels. For example, it is known that examining total toe is the equivalent of looking at the individual toe of each of the front wheels. It should also be understood that although the invention is described in connection with checking total toe of the front axle, the invention could also be applied to the checking of the rear axle toe.

Once the second set of measurements is taken, the computer 31 computes the toe parameter and the steer ahead angle of the front wheels. If the toe parameter falls outside a predetermined toe range, such as one degree, the operating instructions for the computer causes the display 34 to display a screen such as that shown in FIG. 2. This screen includes a bar graph type representation of the toe parameter for the front wheels (labeled 41) and a warning 43 that states Warning: Total Toe is larger than 1 degree. Rolling compensation may not be accurate. Adjust Total Toe and press "Restart Procedure" or Press "Use Jacking Compensation."

In some cases, total toe of more than one degree may actually fall within manufacturer's specifications. In that situation, the alternative screen of FIG. 2A is displayed, which includes the modified warning:

Warning: Total Toe is larger than 1 degree but within specification for this vehicle. Rolling compensation may not be accurate. Press "Use Jacking Compensation" or Press "Ignore Warning."

The bar graph in any case illustrates not only the value of total toe, but also the direction (positive or negative) in which total toe of the front wheels falls outside the toe range (in this example the range is set at one degree, but other ranges could be used). As the total toe is corrected by the user, the bar graph displays the change to the user in substantially real time, so that the user can readily determine whether the change is being made in the correct direction, and when the total toe falls within the toe range.

Similarly, the operating instructions cause the display of the fact that the steer ahead (steer ahead angle) of the front wheels falls outside the desired range (in this example, 1.5 degrees), as shown at 47. Note that the fact that the total toe falls outside the desired "toe" range supersedes the fact that the steer ahead is out of range, so that the user is told to correct total toe, rather than steer ahead, when both fall outside desired ranges.

At this point in the compensation process, the sensor elements are not compensated because the total toe and/or steer ahead fall outside the ranges. Additional compensation measurements are taken, after correction of total toe and/or steer ahead, unless the user selects "Ignore Warning" (labeled 51) from the screen.

If total toe is within range, but steer ahead falls outside the desired range, the operating instructions cause the screen shown in FIG. 3 to be displayed. This screen provides information to the user concerning the probable cause of the inaccuracy in the compensation (in this case steer ahead outside the range) in both bar graph and written form. The bar graph of FIG. 3, labeled 55 shows the user both the magnitude and the direction of the needed correction. The user can watch the screen of FIG. 3 update itself in substantially real time until the steer ahead falls within the range. The written warning on FIG. 3 reads Warning: The vehicle is not steered ahead. Rolling compensation may not be accurate. Using the steer ahead bar graph, steer the vehicle to straight ahead and then press 'Restart Procedure' Or Press 'Use Jacking Compensation.'

The user simply follows these instructions to correct steer ahead, and then restarts the compensation procedure by selecting the "Restart Procedure" button 59 on screen 33 of FIG. 3.

Although the present invention has been described with respect to a video alignment system with optical target sensor elements, it should be appreciated that the invention is equally applicable to other alignment systems, such as those in which the sensor elements on the wheels include some active sensing elements. In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. In a system for measuring vehicle alignment angles, said system having a plurality of sensor elements for mounting to wheels of a vehicle to be aligned, said system using said sensor elements to measure various angles such as steer ahead angle and toe, said system also having a display for displaying information to a user and having a memory for storing operating instructions for the system, the improvement comprising operating instructions stored in the memory for determining from compensation measurements taken at a minimum of first and second longitudinally displaced positions whether a toe parameter of two wheels falls outside a predetermined toe range, said operating instructions stored in the memory further including instructions responsive to said toe parameter falling outside the toe range to control the system to display to the user information indicative of the need to adjust the toe parameter before taking additional compensation measurements.

2. The system as set forth in claim 1 wherein the sensor elements are optical targets removably mounted to the wheels.

3. The system as set forth in claim 1 wherein at least some sensor elements include active sensing elements removably mounted to the wheels.

4. The system as set forth in claim 1 wherein the operating instructions stored in memory further include instructions responsive to the toe parameter falling outside the predetermined toe range to cause the display of a graphical representation of the toe parameter and a substantially real time display of the change of the toe parameter as the toe parameter is corrected by the user.

5. The system as set forth in claim 1 further including operating instructions stored in memory which determine when the toe parameter falls outside the range if the toe parameter is within vehicle manufacturer specifications for toe, said instructions being responsive to the toe parameter falling outside the range but being within specification to cause the system to indicate to the user that rolling compensation should not be used.

6. The system as set forth in claim 1 wherein said operating instructions stored in the memory further includes instructions and for determining from measurements taken at a minimum of first and second longitudinally displaced positions whether the steer ahead angle of the vehicle falls within a predetermined steer ahead range, said operating instructions further being responsive to said toe parameter falling within the predetermined toe range and to the steer ahead angle falling outside the predetermined steer ahead range to control the system to display to the user information indicative of the need to adjust steer ahead angle before taking additional compensation measurements.

7. The system as set forth in claim 6 wherein the operating instructions stored in memory further include instructions responsive to the steer ahead angle falling outside the range to cause the display of a graphical representation of the steer ahead angle and a substantially real time display of the change of steer ahead angle as the steer ahead angle is corrected by the user.

8. In a system for measuring vehicle alignment angles, said system having a plurality of sensor elements for mounting to wheels of a vehicle to be aligned, said system using said sensor elements to measure various angles such as steer ahead angle and toe, said system also having a display for displaying information to a user and having a memory for storing operating instructions for the system, the improvement comprising:

operating instructions stored in the memory for determining from compensation measurements taken at a minimum of first and second longitudinally displaced positions whether the steer ahead angle of the vehicle falls within a predetermined steer ahead range;

said operating instructions stored in the memory further including instructions responsive to the steer ahead angle falling outside the predetermined range to control the system to display to the user information indicative of the need to adjust steer ahead angle before taking additional compensation measurements.

9. The system as set forth in claim 8 wherein the operating instructions stored in memory further include instructions responsive to the steer ahead angle falling outside the steer ahead range to cause the display of a graphical representation of the steer ahead angle and a substantially real time display of the change of the steer ahead angle as the steer ahead angle is corrected by the user.

10. The system as set forth in claim 8 wherein the sensor elements are optical targets removably mounted to the wheels.

11. The system as set forth in claim 8 wherein at least some sensor elements include active sensing elements removably mounted to the wheels.

12. In a system for measuring vehicle alignment angles, said system having a plurality of sensor elements for mounting to wheels of a vehicle to be aligned, said system using said sensor elements to measure various angles such as steer ahead angle and toe, said system also having a display for displaying information to a user and having a memory for storing operating instructions for the system, the improvement comprising:

operating instructions stored in the memory for determining from compensation measurements taken at a minimum of first and second longitudinally displaced positions values of the toe parameter of two wheels and values of the steer ahead angle of the vehicle;

said operating instructions stored in the memory further including instructions responsive to said toe parameter not falling outside the toe range and to the steer ahead angle falling outside the predetermined range to control the system to display to the user information indicative of the need to adjust steer ahead angle before taking additional compensation measurements.

13. The system as set forth in claim 12 wherein the operating instructions stored in memory further include instructions responsive to the steer ahead angle falling outside the range to cause the display of a graphical representation of the steer ahead angle and a substantially real time display of the change of steer ahead angle as the steer ahead angle is corrected by the user.

14. In apparatus for measuring vehicle alignment angles, said apparatus having a plurality of sensor elements for mounting to wheels of a vehicle to be aligned, said apparatus using said sensor elements to measure various angles such as toe angles, said apparatus also having a display for displaying information to a user and having a memory for storing operating instructions for the apparatus, the method of compensating the sensor elements comprising:

taking compensation measurements with the vehicle in a first position;

taking compensation measurements with the vehicle in a second position, said second position being longitudinally displaced from the first position;

determining from the compensation measurements taken at the first and second positions whether a toe parameter of two wheels falls outside a predetermined toe range;

if the toe parameter falls outside the toe range, controlling the apparatus to display to the user information indicative of the need to adjust the toe parameter before taking additional compensation measurements.

15. The method as set forth in claim 14 including the step of rolling the vehicle from the first to the second position along a predetermined path.

16. The method as set forth in claim 14 wherein compensation measurements are taken only at the first and second positions.

17. The method as set forth in claim 14 including the step of displaying, when the toe parameter falls outside the toe range, a graphical representation of the toe parameter and a substantially real time display of the change of the toe parameter as the toe parameter is corrected by the user.

18. In apparatus for measuring vehicle alignment angles, said apparatus having a plurality of sensor elements for mounting to wheels of a vehicle to be aligned, said apparatus using said sensor elements to measure various angles such as steer ahead angle, said apparatus also having a display for displaying information to a user and having a memory for storing operating instructions for the apparatus, the method of compensating the sensor elements comprising:

taking compensation measurements with the vehicle in a first position;

taking compensation measurements with the vehicle in a second position, said second position being longitudinally displaced from the first position;

determining from the compensation measurements taken at the first and second positions whether the steer ahead angle of the vehicle falls within a predetermined range;

if the steer ahead angle falls outside the predetermined range, controlling the apparatus to display to the user information indicative of the need to adjust steer ahead angle before taking additional compensation measurements.

19. The method as set forth in claim 18 including the step of rolling the vehicle from the first to the second position along a predetermined path.

20. The method as set forth in claim 18 wherein compensation measurements are taken only at the first and second positions.

21. The method as set forth in claim 18 including the step of displaying, when the steer ahead angle falls outside the range, a graphical representation of the steer ahead angle and a substantially real time display of the change of steer ahead angle as the steer ahead angle is corrected by the user.

22. In a vehicle alignment system having sensor elements to be compensated, the compensation method comprising:

taking compensation measurements at a first position of a vehicle;

moving the vehicle longitudinally and taking compensation measurements at a second position of the vehicle;

estimating from the measurements taken at the first and second positions whether compensation is acceptable;

identifying to the user a probable cause of inaccuracy in the compensation procedure in those instances where compensation was estimated to not be acceptable.

23. The method as set forth in claim 22 wherein the probable causes of inaccuracy include excessive total toe, excessive steer ahead angle, or excessive individual toe.

24. The method as set forth in claim 23 wherein excessive total toe is preferentially identified to the user as a probable cause of inaccuracy.

25. The method as set forth in claim 22 further including displaying, in connection with the identification of the probable cause of inaccuracy a graphical representation of the magnitude of the cause of inaccuracy and a substantially real time display of the change in the cause of inaccuracy as the inaccuracy is corrected by the user.

\* \* \* \* \*